(12) United States Patent
Takeuchi et al.

(10) Patent No.: US 7,435,345 B2
(45) Date of Patent: Oct. 14, 2008

(54) ELEMENT REPLACEMENT TYPE FILTER

(75) Inventors: Tomohiko Takeuchi, Nagoya (JP); Toshihiro Takahara, Kariya (JP); Naoki Tada, Handa (JP); Sadahito Fukumori, Okazaki (JP)

(73) Assignees: Toyota Boshoku Kabushiki Kaisha, Kariya-shi (JP); Denso Corporation, Kariya-shi (JP)

( * ) Notice: Subject to any disclaimer, the term of this patent is extended or adjusted under 35 U.S.C. 154(b) by 90 days.

(21) Appl. No.: 11/504,583

(22) Filed: Aug. 16, 2006

(65) Prior Publication Data

US 2007/0045171 A1    Mar. 1, 2007

(30) Foreign Application Priority Data

Aug. 23, 2005    (JP)    ............................. 2005-241830

(51) Int. Cl.
*B01D 27/08*    (2006.01)
*B01D 35/30*    (2006.01)

(52) U.S. Cl. .................. 210/232; 210/443; 210/450

(58) Field of Classification Search .................. 210/232, 210/443, 450
See application file for complete search history.

(56) References Cited

U.S. PATENT DOCUMENTS 1,730,475 A * 10/1929 Pelletier ..................... 220/304
4,915,831 A * 4/1990 Taylor ......................... 210/232

FOREIGN PATENT DOCUMENTS

| DE | 198 23 339 A1 | 12/1999 |
| EP | 0 773 054 A1 | 5/1997 |
| EP | 1 093 839 A1 | 4/2001 |
| JP | 10-249109 | 9/1998 |

* cited by examiner

*Primary Examiner*—Thomas M Lithgow
(74) *Attorney, Agent, or Firm*—Oblon, Spivak, McClelland, Maier & Neustadt, P.C.

(57) ABSTRACT

An element replacement type filter accommodates an element assembly that includes a filter element within a casing formed from a first casing member and a second casing member which are mutually screwable by relative rotation, and provides an anti-loosening mechanism between the first casing member and the second casing member. The anti-loosening mechanism comprises a regulating portion that is provide on an outer peripheral side of the first casing member; and a leaf spring member made of metal that is provided elastically deformable in a radial direction of the second casing member, with a base end side thereof fixed to an outer peripheral side of the second casing member. The leaf spring member has a free end side that is provided with a contact portion, which contacts the regulating portion due to relative rotation of the first casing member and the second casing member.

6 Claims, 4 Drawing Sheets

ELEMENT REPLACEMENT TYPE FILTER

INCORPORATION BY REFERENCE

The disclosure of Japanese Patent Application No. 2005-241830 filed on Aug. 23, 2005 including the specification, drawings and abstract is incorporated herein by reference in its entirety.

BACKGROUND OF THE INVENTION

1. Field of the Invention

The present invention relates to an element replacement type filter. More particularly, the present invention relates to an element replacement type filter capable of minimizing a required dimension in the radial direction of a casing, and equipped with an anti-loosening mechanism that has a high-strength, highly durable, simple and low-cost construction.

2. Description of the Related Art

Related art is known in which an element replacement type filter is formed by accommodating an element assembly including a filter element within a casing. The casing is formed from a cap and a case, which can be screwed together by relative rotation. Provided between the cap and the case is an anti-loosening mechanism to suppress oil leakage caused by loosening of the cap (see Patent Document 1 for an example).

Figure 9:
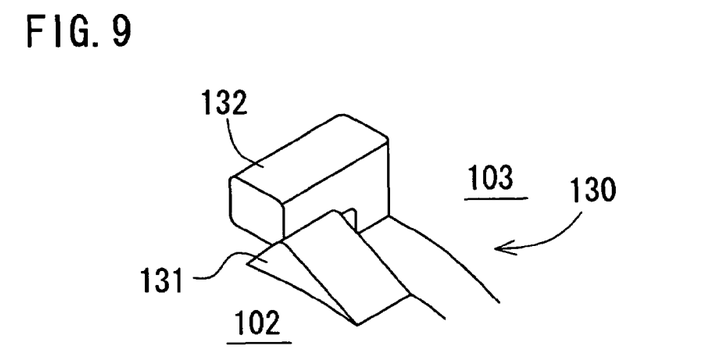
FIG. 9 is an explanatory view for describing an anti-loosening mechanism according to related art.

For example, FIG. 9 shows an anti-loosening mechanism 130 according to known related art, wherein an outer peripheral side of a cap 102 made of synthetic resin is integrally formed with a projecting portion 131, and an outer peripheral side of a case 10 made of synthetic resin is integrally formed with a stopper member 132. The projecting portion 131 is shaped to have a gentle slope in a tightening direction of the cap 102 for easy tightening, whereas a slope in a loosening direction of the cap 102 is sharp so that loosening is difficult.

However, according to the anti-loosening mechanism 130 described above, loosening of the cap 102 is prevented only by the elasticity of the stopper member 132 made of synthetic resin. As a result, the stopper member may be damaged from contact with tools and attachment/removal of the cap under cold conditions, causing problems in terms of strength and durability.

In addition, Patent Document 1 discloses a structure in which a ring-shaped leaf spring that elastically deforms in an axial center direction of the casing is provided on an inner peripheral side of the case. In addition, an inner peripheral side of the cap is provided with concave-shaped portion that can be engaged with a convex-shaped portion of the leaf spring (see FIG. 1 and the like of Patent Document 1 for an example).

Patent Document 1 further discloses a structure in which a mobile pin biased by a coil spring and projectable in the axial center direction of the casing is provided on the inner peripheral side of the case. In addition, a projecting portion that can engage with the mobile pin is provided on the outer peripheral side of the cap (see FIG. 4 and the like of Patent Document 1 for an example).

According to the former structure, however, the anti-loosening mechanism is provided within the casing, which in turn increases the size of an outer periphery dimension of the casing. In particular, use of the ring-shaped leaf spring that elastically deforms in the axial center direction of the case increases the dimension in the radial direction of the casing by at least an amount of space needed to dispose the leaf spring. Moreover, it can be difficult to tell whether the anti-loosening mechanism is defective in any manner.

Also, the anti-loosening mechanism in the latter structure is formed of at least three parts: the mobile pin, the coil spring, and the projecting portion. This results in a complicated and expensive structure with many parts. Furthermore, providing the coil spring and the mobile pin on the outer peripheral side of the cap requires the forming of a projecting portion with a predetermined projection width on the outer peripheral side of the cap, which of course also increases the dimension in the radial direction of the casing. To increase the reliability of the engagement of the mobile pin and the projecting portion in particular, a coil spring whose inner diameter is normally approximately 5 mm is used, and the projecting portion on the outer peripheral side of the cap typically has a projection width of approximately 10 mm. It can be difficult to tell whether the anti-loosening mechanism (especially the coil spring) is defective in any manner. Moreover, there is a risk of problems including reduced slidability of the mobile pin due to the penetration of foreign matter such as sand into the sliding hole of the mobile pin. When such problems occur in the anti-loosening mechanism, the entire cap must be replaced.

[Patent Document 1] Japanese Patent Application Publication No. JP-A-HEI10-249109

SUMMARY OF THE INVENTION

In view of the foregoing circumstances, it is an object of the present invention to provide an element replacement type filter capable of minimizing a required dimension in the radial direction of a casing, and equipped with an anti-loosening mechanism that has a high-strength, highly durable, simple and low-cost construction.

The present invention has the following structure.

1. An element replacement type filter that accommodates an element assembly that includes a filter element within a casing formed from a first casing member and a second casing member which are mutually screwable by relative rotation, and that provides an anti-loosening mechanism between said first casing member and said second casing member, wherein said anti-loosening mechanism comprises a regulating portion that is provided on an outer peripheral side of said first casing member; and a leaf spring member made of metal that is provided elastically deformable in a radial direction of said second casing member, with a base end side thereof fixed to an outer peripheral side of said second casing member, and said leaf spring member has a free end side that is provided with a contact portion, which contacts said regulating portion due to relative rotation of said first casing member and said second casing member.

2. The element replacement type filter according to 1 above, wherein said contact portion comprises:

a first contact surface that contacts said regulating portion when said first casing member and said second casing member are relatively rotated in directions that tighten screwing thereof; and a second contact surface that contacts said regulating portion when said first casing member and said second casing member are relatively rotated in directions that loosen screwing thereof, wherein an angle formed by said first contact surface and a tangent of said second casing member is set to a value smaller than an angle formed by said second contact surface and the tangent of said second casing member.

3. The element replacement type filter according to 2 above, wherein
   said angle formed by said first contact surface and the tangent of said second casing member is set to 10 to 50 degrees, and said angle formed by said second contact surface and the tangent of said second casing member is set to 40 to 80 degrees.
4. The element replacement type filter according to 1 above, wherein
   said leaf spring member has a base end side provided with a press-fixed portion that is formed by folding said base end side, and that is elastically deformed and pressed into a groove portion formed on said outer peripheral side of said second casing member.
5. The element replacement type filter according to 4 above, wherein
   said leaf spring member opposes an outer peripheral surface of said second casing member with a predetermined space therebetween, in a state where said press-fixed portion is pressed into said groove portion.
6. The element replacement type filter according to 4 above, wherein
   said free end side of said leaf spring member is provided with a grip portion that is formed by folding said free end side.
7. The element replacement type filter according to 1 above, wherein
   said leaf spring member extends in an axial center direction of said second casing member.

According to the element replacement type filter of the present invention, with the first and second casing members screwed-tightened together, the contact portion of the leaf spring member on the outer peripheral side of the second casing member is disposed at a position in the vicinity of (or in contact with) the regulating portion on the outer peripheral side of the first casing member. Thus due to this state, the contact between the regulating portion and the contact portion restricts unnecessary relative rotation of the first casing member and the second casing member, regardless of whether the screwed state of the first and second casing members loosens. In addition, a leaf spring member made of metal is used, which can therefore help suppress damage to the leaf spring member such as from contact with tools and attachment/removal of a casing member under cold conditions. Consequently, a structure with high strength and excellent durability can be achieved. Furthermore, the leaf spring member is provided elastically deformable in the radial direction of a casing member. Thus, a more compact structure can be achieved by setting the dimension in the radial direction of the casing to the minimum required.

In addition, the contact portion has a first contact surface and a second contact surface. An angle formed by the first contact surface and a tangent of the second casing member is set to a value smaller than an angle formed by the second contact surface and the tangent of the second casing member. In this case, when the first and second casing members are relatively rotated in directions that tighten screwing thereof, tightening can be easily performed despite contact between the regulating portion and the first contact surface. Meanwhile, even if the first and second casing members are relatively rotated in directions that loosen screwing thereof, loosening is made difficult due to contact between the regulating portion and the second contact surface.

Furthermore, if the angle formed by the first contact surface and the tangent of the second casing member is set to 10 to 50 degrees, and the angle formed by the second contact surface and the tangent of the second casing member is set to 40 to 80 degrees, tightening can be more easily performed despite contact between the regulating portion and the first contact surface. Meanwhile, loosening is made more difficult due to contact between the regulating portion and the second contact surface.

Furthermore, if the press-fixed portion is provided on the base end side of the leaf spring member, then the press-fixed portion is pressed into the groove portion formed on the outer peripheral side of the second casing member. Therefore, the leaf spring member can be easily and quickly attached/removed from the second casing member during assembly, replacement, or the like of the leaf spring member.

Moreover, the leaf spring member may oppose the outer peripheral surface of the second casing member with a predetermined space therebetween while the press-fixed portion is pressed into the groove portion. In such case, it is possible to suppress any vibration of the leaf spring member during operation of the engine from being transmitted to the outer peripheral surface of the second casing member by the leaf spring member, and thus generating noise or the like.

The free end side of the leaf spring member may also be provided with a grip portion. In such case, the leaf spring member can be easily and quickly attached/removed from the second casing member during assembly, replacement, or the like of the leaf spring member, by grasping the grip portion with a tool or by hand.

Furthermore, if the leaf spring member extends in an axial center direction of the second casing member, a simpler and more compact structure can be achieved.

DETAILED DESCRIPTION OF THE PREFERRED EMBODIMENTS

1. Element Replacement Type Filter

An element replacement type filter according to the present invention is a filter formed by accommodating an element assembly including a filter element within a casing. The casing is formed from a first casing member and a second casing member that can be screwed together by relative rotation. The element replacement type filter is provided with an anti-loosening mechanism that is described later.

The above-mentioned "first casing member" and "second casing member" can be made from material such as metal or synthetic resin, for example. Conceivable screw configurations of the first and second casing members include, for example, (1) a configuration that has a mail screw portion and a female screw portion that can be screwed together, and (2) a configuration that has a groove portion and a convex portion that can be screwed together (also referred to as a "bayonet structure").

The above-mentioned "filter element" is typically formed into a folded chrysanthemum shape. Conceivable materials used for the filter element include filter paper and non-woven fabric, for example.

The above-mentioned "element assembly" can be formed, for example, by mounting the filter element to an outer peripheral side of a cylindrical member made of metal.

The above-mentioned "anti-loosening mechanism" is provided between the first casing member and the second casing member, and is provided with a regulating portion and a leaf spring member that are described below.

The shape, size, quantity, and the like of the above-mentioned "regulating portion" are not particularly limited, provided that the regulating portion is provided on the outer peripheral side of the first casing member. The regulating portion, for example, can be provided projecting toward a centrifugal direction of the first casing member. In addition, the regulating portion may also be provided integrated with the first casing member, or the provided attached to the first casing member as a member separate from the first casing member.

The shape, size, quantity, and the like of the above-mentioned "leaf spring member" are not particularly limited, provided that the leaf spring member is made from metal, and the leaf spring member is provided elastically deformable in a radial direction of the second casing member with a base end side of the leaf spring member fixed to the outer peripheral side of the second casing member. The leaf spring member may, for example, extend in an axial center direction of the second casing member, and may be provided generally parallel on an outer peripheral surface of the second casing member. In addition, the leaf spring member can be made from material such as spring steel, alloyed steel (including chrome vanadium steel and manganese chromium steel), stainless steel, or phosphor bronze, for example.

A free end side of the leaf spring member is provided with a contact portion that is described below.

The shape, size, quantity, and the like of the above-mentioned "contact portion" are not particularly limited, provided that the contact portion can come into contact with the regulating portion through relative rotation of the first casing member and the second casing member. The contact portion may also be provided projecting in a centripetal direction of the second casing member, for example.

The contact portion can include a first contact surface and a second contact surface that are described below.

The shape, size, quantity, and the like of the above-mentioned "first contact surface" are not particularly limited, provided that the first contact surface is in contact with the regulating portion when the first casing member and the second casing member are relatively rotated in a screw tightening direction. The first contact surface may be formed, for example, as a combination of one or more types among a flat surface, a curved surface, or the like.

The shape, size, quantity, and the like of the above-mentioned "second contact surface" are not particularly limited, provided that the second contact surface is in contact with the regulating portion when the first casing member and the second casing member are relatively rotated in a screw tightening direction. The second contact surface may be formed, for example, as a combination of one or more types among a flat surface, a curved surface, or the like.

Figure 3:
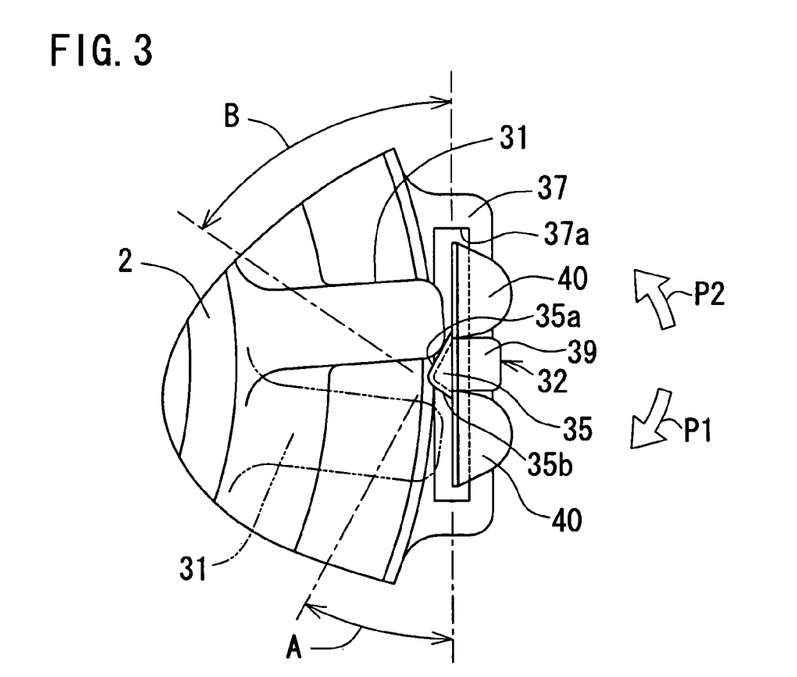
FIG. 3 is a drawing of an arrow view III in FIG. 2.

Here, an angle A formed by the first contact surface and a tangent of the second casing member is set, for example, to a value that is smaller than that for an angle B formed by the second contact surface and a tangent of the second casing member (see FIG. 3). The angle A may be set to 10 to 50 degrees (and preferably to 20 to 40 degrees), whereas the angle B may be set to 40 to 80 degrees (and preferably to 50 to 70 degrees).

Conceivable configurations for attaching the leaf spring member include, for example, (1) a configuration in which a press-fixed portion provided on the base end side of the leaf spring member is formed by folding over the base end side, and the press-fixed portion is elastically deformed and pressed into a groove portion formed on the outer peripheral side of the second casing member; and (2) a configuration in which the base end portion of the leaf spring member is attached to the outer peripheral side of the second casing member through caulking or the like. Among these configurations, the former is more desirable in terms of ease of maintenance.

In the former configuration, pressing the press-fixed portion into the groove portion from the axial center direction of the casing is preferable in terms of detachability of the leaf spring member.

Figure 2:
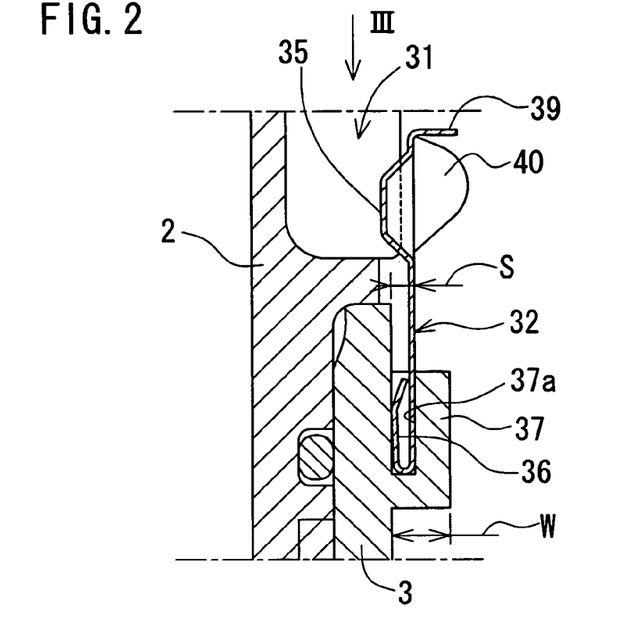
FIG. 2 is an enlarged view of a main portion in FIG. 1.

It is also preferable in terms of noise suppression in the former configuration that while the press-fixed portion is pressed in to the groove portion, the leaf spring member opposes the outer peripheral surface of the second casing member with a predetermined space S therebetween (see FIG. 2).

The free end side of the leaf spring member may be provided, for example, with a grip portion that is formed by folding over the free end side. The grip portion may be provided extending in the centrifugal direction of the second casing member.

WORKING EXAMPLES

Hereinafter, the present invention will be explained in detail based on working examples with reference to accompanying drawings. Note that in the present working example, an "element replacement type filter" according to the present invention is described as an oil filter attached to a cylinder block of an internal combustion engine (not shown) by way of example.

(1) Structure of the Oil Filter

Figure 1:
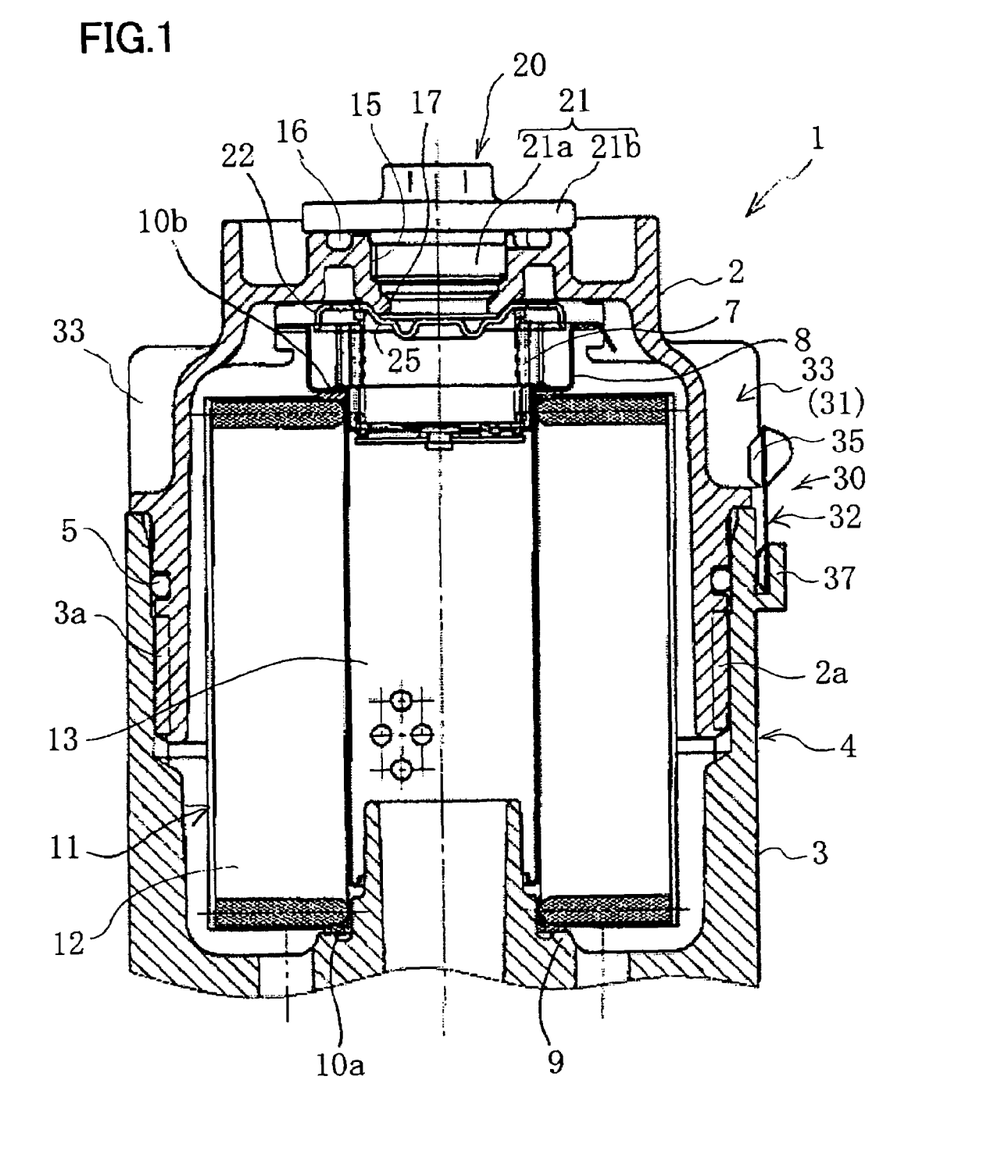
FIG. 1 is a vertical cross-sectional view of a filter according to a working example.

As FIG. 1 shows, an oil filter 1 according to the present invention is provided with a casing 4 that is formed from a cap 2 (as an example of a "first casing member" according to the present invention) and a case 3 (as an example of a "second casing member" according to the present invention), which have bottomed cylindrical shapes made of metal and can be screwed together by relative rotation.

An outer peripheral surface of the cap 2 is formed with a male screw portion 2a, and has an O-ring 5 attached. Meanwhile, an inner peripheral surface of the case 3 is formed with a female screw portion 3a. An internal portion of the casing 4 becomes sealed (maintained fluid-tight) when the male screw portion 2a and the female screw portion 3a are screwed together such that the cap 2 and the case 3 become screwed together via the O-ring 5.

In the internal portion of the casing 4, the energizing force of a spring 7 holds an element assembly 11 between a plate 8 and a case projecting portion 9 provided on the case 3, via respective seal members 10a, 10b. The element assembly 11 is formed by attaching a filter element 12, which is formed by folding filter paper into a folded chrysanthemum shape, to an outer periphery of a cylindrical member 13 that is made from steel and has a plurality of through holes.

A center of a bottom portion of the cap 2 is provided with a drain hole 15 that has a female screw formed on an inner periphery thereof. Also, attached to the bottom portion of the cap 2 is an O-ring 16 that surrounds the drain hole 15. The bottom portion of the cap 2 is also provided with an annular cap projecting portion 17.

Next, a drain mechanism 20 provided on the cap 2 will be explained. The drain mechanism 20 is provided with a drain member 21 and a valve member 22 that are made from metal.

The drain member 21 includes a plug portion 21a that forms a male screw, and a flange portion 21b that continues from the plug portion 21a. The flange portion 21b of the drain member 21 contacts and presses against the O-ring 16 to seal the drain hole 15 when the male screw of the drain member 21 and the female screw of the drain hole 15 are screwed together such that the drain member 21 is screwed shut to the drain hole 15.

The valve member 22 is formed overall into a saucer-like shape, and has a contact portion 25 that is in contact with an outer peripheral surface of the cap projecting portion 17. The energizing force of the spring 7 typically puts the contact portion 25 in contact with the cap projecting portion 17, whereby the drain hole 15 is metal-sealed. Accordingly, only minute amounts of residual oil inside the casing 4 flow from the drain hole 15 to outside, regardless of whether the drain member 21 is removed from the drain hole 15. With the drain member 21 removed from the drain hole 15, a worker can insert a cylindrical drain tool (not shown) into the drain hole 15, an end side of which presses the valve member 22 against the energizing force of the spring 7. In so doing, the seal of the drain hole 15 is opened by the valve member 22, and residual oil inside the casing 4 can be discharged to outside via a slit and a central hole formed by the drain tool.

Next, an anti-loosening mechanism 30 provided between the cap 2 and the case 3 will be explained. The anti-loosening mechanism 30 is formed from a regulating portion 31 and a leaf spring member 32.

An outer peripheral side of the cap 2 is provided with a plurality of ribs 33 (e. g. 4 ribs) at predetermined intervals along an inner peripheral direction thereof, which project in the centrifugal direction of the cap 2. Among the plurality of ribs 33, one predetermined rib 33 functions as the regulating portion 31. Note that the respective ribs 33 are provided as areas to be manipulated by a worker when rotating the cap 2 with respect to the case 3.

The leaf spring member 32, as FIGS. 2 and 3 show, is made from metal and provided elastically deformable in a radial direction of the case 3 with a base end side of the leaf spring member 32 fixed to the outer peripheral side of the case 3. The leaf spring member 32 extends in an axial center direction of the case 3, and is provided generally flat on an outer peripheral surface of the case 3.

A free end side of the leaf spring member 32 is provided with a contact portion 35 that projects in the centripetal direction of the case 3. The contact portion 35 has a first contact surface 35a and a second contact surface 35b. The first contact surface 35a comes in contact with the regulating portion 31 when the cap 2 is rotated in a tightening direction P1 with respect to the case 3. The second contact surface 35b comes in contact with the regulating portion 31 when the cap 2 is rotated in a loosening direction P2 with respect to the case 3. An angle A formed by the first contact surface 35a and a tangent of the case 3 is set to around 30 degrees, and an angle B formed by the second contact surface 35b and a tangent of the case 3 is set to around 60 degrees (see FIG. 3).

The base end side of the leaf spring member 32 is provided with a press-fixed portion 36 that is formed by folding over the base end side. The press-fixed portion 36 is elastically deformed and pressed from the axial center direction of the case 3 into a groove portion 37a, which is formed on a strike plate 37 that is provided on the outer peripheral side of the case 3. With the press-fixed portion 36 pressed into the groove portion 37a, the free end side (an upward side) from the press-fixed portion 36 of the leaf spring member 32 opposes the outer peripheral surface of the case 3 with a predetermined space S therebetween (see FIG. 2). Note that a projection width W of the strike plate 37 from the outer peripheral surface of the case 3 is set to around 5 mm.

Figure 4:
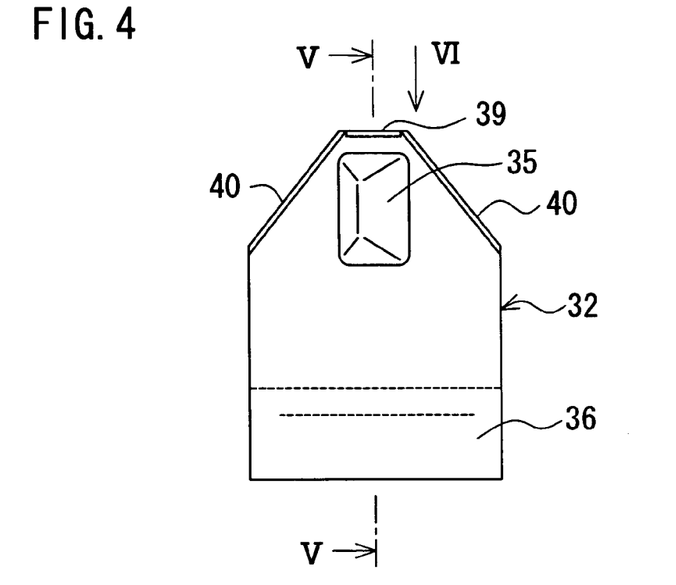
FIG. 4 is a frontal view of a leaf spring member.
Figure 5:
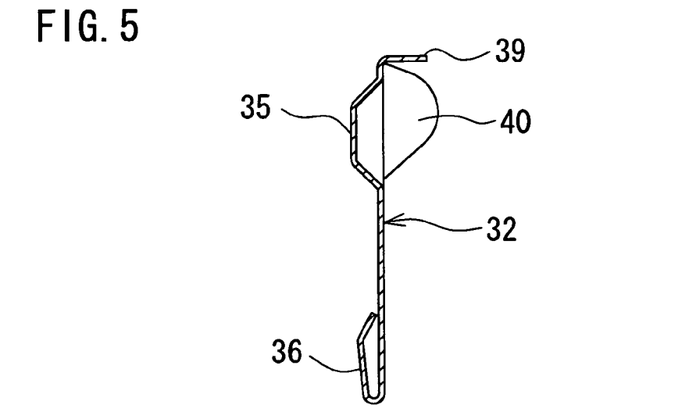
FIG. 5 is a drawing of a section V-V in FIG. 4.
Figure 6:
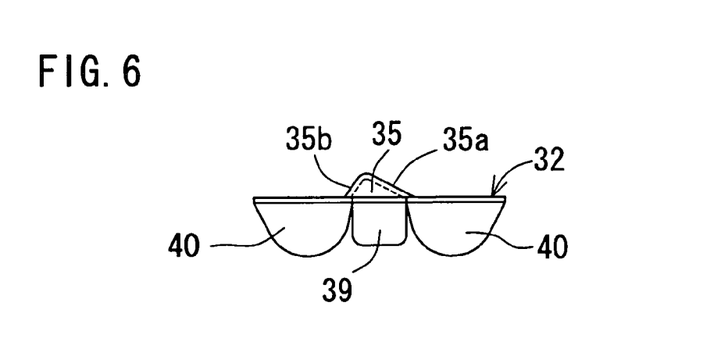
FIG. 6 is a drawing of an arrow view VI in FIG. 4.

The free end side of the leaf spring member 32, as FIGS. 4 to 6 show, is also provided with a grip portion 39 that is formed by folding over the free end side. The grip portion 39 is provided extending in a direction opposite the contact portion 35, i. e. , extending in the centrifugal direction of the case 3. Furthermore, the free end side of the leaf spring member 32 is provided with right and left folded portions 40, which are formed by folding both sides of the free end side toward the inner peripheral direction of the case 3. The respective folded portions 40 are provided extending in a direction opposite the contact portion 35, i. e. , extending in the centrifugal direction of the case 3. In addition, the respective folded portions 40 are provided at positions corresponding to the height of the contact portion 35.

(2) Operation of the Oil Filter

Next, the operation of the oil filter 1 with the above-described structure will be explained.

To attach the cap 2 to the case 3, first, the male screw portion 2a of the cap 2 is screwed together with the female screw portion 3a of the case 3, whereby the cap 2 is rotated in the tightening direction P1 (see FIG. 3). Thus, the regulating portion 31 of the cap 2 comes in contact with the first contact surface 35a of the contact portion 35 of the leaf spring member 32 (see the solid line in FIG. 3). Since the first contact surface 35a is set at a relatively gentle angle (around 30 degrees), the leaf spring member 32 is easily elastically deformed in the centrifugal direction of the case 3 so that the cap 2 can be rotated in the tightening direction P1 without resistance.

Once the cap 2 is completely screwed together with the case 3, the regulating portion 31 of the cap 2 becomes disposed at a position in the vicinity of the contact portion 35 of the leaf spring member 32 (see the dotted line in FIG. 3). When the cap 2 is rotated in the loosening direction P2 by a reduction in tightening torque subsequent to this state, the regulating portion 31 of the cap 2 comes in contact with the second contact surface 35b of the contact portion 35 of the leaf spring member 32. In this case, since the second contact surface 35b is set at a relatively sharp angle (around 60 degrees), the leaf spring member 32 is not prone to elastically deform in the radial direction of the case 3, such that the contact state between the second contact surface 35b and the regulating portion 31 is maintained and rotation of the cap 2 in the loosening direction P2 is restricted.

Note that to release the cap 2 from its completely screwed together state with the case 3, a suitable tool such as a torque wrench is used to initially loosen the cap 2 by rotation, after which the rib 33 can be grasped by hand for further loosening by rotation.

(3) Effects of the Working Examples

According to the oil filter 1 of the present working example, while the cap 2 and the case 3 are tightened together, the contact portion 35 of the leaf spring member 32 of the case 3 is disposed at a position in the vicinity of (or in contact with) the regulating portion 31 of the cap 2. Thus due to this state, the contact between the regulating portion 31 and the contact portion 35 restricts unnecessary relative rotation of the cap 2 and the case 3, regardless of whether the cap 2 loosens with respect to the case 3 because of a reduction in tightening torque. In addition, a leaf spring member 32 made of metal is used, which can therefore help suppress damage to the leaf spring member 32 such as from contact with tools and attachment/removal of the cap 2 under cold conditions. Consequently, a structure with high strength and excellent durability can be achieved. Furthermore, the leaf spring member 32 is provided elastically deformable in the radial direction of the case 3. Thus, compared to related art provided with a spring member that is elastically deformable in the axial center direction of the casing, a more compact structure can be achieved by setting the dimension in the radial direction of the casing to the minimum required. Also, the anti-loosening mechanism 30 is structured such that the regulating portion 31 is provided on the outer peripheral side of the cap 2 and the leaf spring member 32 is provided on the outer peripheral side of the case 3. Thus, defects in the leaf spring member 32 can be more easily confirmed than in related art, where the spring member is provided inside the casing, a sliding hole or the like.

Furthermore, in the present working example, the contact portion 35 of the leaf spring member 32 has a first contact surface 35a and a second contact surface 35b. The angle A formed by the first contact surface 35a and a tangent of the case 3 is set to around 30 degrees, and the angle B formed by the second contact surface 35b and a tangent of the case 3 is set to around 60 degrees. Therefore, when the cap 2 is rotated in the tightening direction P1 with respect to the case 3, tightening can be easily performed despite contact between the regulating portion 31 and the first contact surface 35a. Meanwhile, even if the cap 2 rotates in the loosening direction P2 with respect to the case 3 due to a reduction in tightening torque, loosening is made difficult due to contact between the regulating portion 31 and the second contact surface 35b.

According to the present working example, the press-fixed portion 36 provided on the base end side of the leaf spring member 32 is pressed into the groove portion 37a of the strike plate 37, which is provided on the outer peripheral side of the case 3. Therefore, the leaf spring member 32 can be easily and quickly attached/removed from the case 3 during assembly, replacement, or the like of the leaf spring member 32.

According to the present working example, while the press-fixed portion 36 of the leaf spring member 32 is pressed into the groove portion 37a, the upward side from the press-fixed portion 36 of the leaf spring member 32 opposes the outer peripheral surface of the case 3 with a predetermined space S therebetween (see FIG. 2). Therefore, it is possible to suppress any vibration of the leaf spring member 32 during operation of the engine from being transmitted to the outer peripheral surface of the case 3 by the leaf spring member 32, and thus generating noise or the like.

According to the present working example, the free end side of the leaf spring member 32 is provided with the grip portion 39. Therefore, the leaf spring member 32 can be easily and quickly attached/removed from the case 3 during assembly, replacement, or the like of the leaf spring member 32, by grasping the grip portion 39 with a tool or by hand.

Note that the present invention is not particularly limited to the above working example, and various modifications of the working example are possible within the scope of the invention, depending on the purpose and application. Namely, according to the above working example, the regulating portion 31 is provided on the outer peripheral side of the cap 2 and the leaf spring member 32 is provided on the outer peripheral side of the case 3. However, the present invention is not particularly limited to this, and for example, the leaf spring member 32 may be provided on the outer peripheral side of the cap 2 and the regulating portion 31 may be provided on the outer peripheral side of the case 3.

Figure 7:
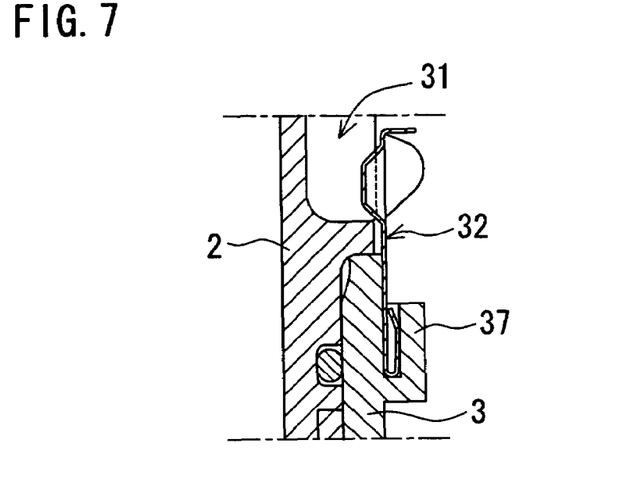
FIG. 7 is an explanatory view for describing a leaf spring member according to another working example.

In addition, according to the above working example, a predetermined space S is provided between the surface of the leaf spring member 32 and the outer peripheral surface of the case 3. However, the present invention is not particularly limited to this, and as shown in FIG. 7 for example, the leaf spring member 32 may be provided such that the surface thereof is in contact with the outer peripheral surface of the case 3.

Figure 8:
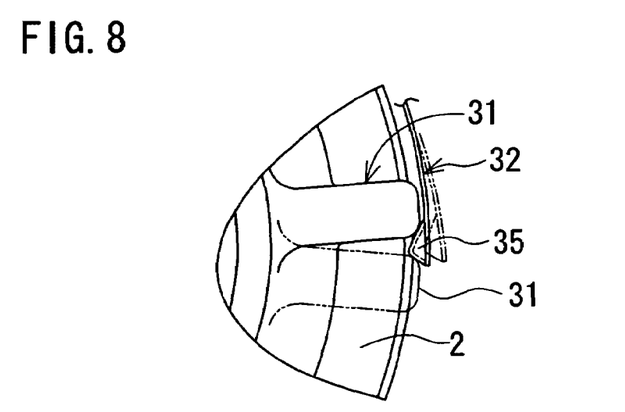
FIG. 8 is an explanatory view for describing a leaf spring member according to yet another working example.

Furthermore, according to the above working example, the leaf spring member 32 is provided so as to extend along the axial center direction of the case 3. However, the present invention is not particularly limited to this, and as shown in FIG. 8 for example, the leaf spring member 32 may be provided so as to extend along the circumferential direction of the case 3.

The present invention is utilized as art that restricts loosening of an element replacement type filter. In particular, the present invention can be utilized as art that restricts loosening of an oil filter that filters oil used in an internal combustion engine.

What is claimed is:

1. An element replacement type filter that accommodates an element assembly that includes a filter element within a casing formed from a first casing member and a second casing member which are mutually screwable by relative rotation, and that provides an anti-loosening mechanism between said first casing member and said second casing member, wherein said anti-loosening mechanism comprises a regulating portion that is provided on an outer peripheral side of said first casing member; and a leaf spring member made of metal that is provided elastically deformable in a radial direction of said second casing member, with a base end side thereof fixed to an outer peripheral side of said second casing member, and said leaf spring member has a free end side that is provided with a contact portion, which contacts said regulating portion due to relative rotation of said first casing member and said second casing member, wherein said contact portion comprises:

a first contact surface that contacts said regulating portion when said first casing member and said second casing member are relatively rotated in directions that tighten screwing thereof; and a second contact surface that contacts said regulating portion when said first casing member and said second casing member are relatively rotated in directions that loosen screwing thereof, wherein an angle formed by said first contact surface and a tangent of said second casing member is set to a value smaller than an angle formed by said second contact surface and the tangent of said second casing member.

2. The element replacement type filter according to claim 1, wherein said leaf spring member extends in an axial center direction of said second casing member.

3. The element replacement type filter according to claim 1, wherein said angle formed by said first contact surface and the tangent of said second casing member is set to 10 to 50 degrees, and said angle formed by said second contact surface and the tangent of said second casing member is set to 40 to 80 degrees.

4. The element replacement type filter according to claim 1, wherein said leaf spring member has a base end side provided with a press-fixed portion that is formed by folding said base end side, and that is elastically deformed and pressed into a groove portion formed on said outer peripheral side of said second casing member.

5. The element replacement type filter according to claim 4, wherein said leaf spring member opposes an outer peripheral surface of said second casing member with a predetermined space therebetween, in a state where said press-fixed portion is pressed into said groove portion.

6. The element replacement type filter according to claim 4, wherein said free end side of said leaf spring member is provided with a grip portion that is formed by folding said free end side.

* * * * *